UNITED STATES PATENT OFFICE.

OTTO NYDEGGER, OF BERN, AND HENRY SCHELLENBERG, OF PERSONICO, SWITZERLAND.

PROCESS OF PRODUCING UREA FROM LIME NITROGEN.

1,417,277. Specification of Letters Patent. Patented May 23, 1922.

No Drawing. Application filed November 6, 1920. Serial No. 422,255.

*To all whom it may concern:*

Be it known that we, OTTO NYDEGGER and HENRY SCHELLENBERG, citizens of Switzerland, residing at Bern, Canton of Bern, and Personico, Canton of Tessin, Switzerland, respectively, have invented certain new and useful Improvements in the Process of Producing Urea from Lime Nitrogen, of which the following is a specification.

Various processes are known for effecting the change of lime-nitrogen into urea by means of acids. The German Patent No. 239,309 describes a process in which dilute acids are used and in which an insoluble salt of lime is formed. According to the German Patents No. 254,474, 256,524 and 257,642 the change is accelerated by the employment of metal-oxides as catalyzer. According to the German Patent No. 285,259 a concentrated solution of cyanamide which is made of lime-nitrogen must be mixed with relatively strong nitric acid. This process has the advantage of leading to solutions of urea which are not too diluted. But the previous production of concentrated solutions of cyanamide makes the process more complicated.

If we try in a similar way to add strong nitric-acid to a suspension of lime-nitrogen, the reaction takes place in so lively a manner that local decompositions take place. Even with intensive cooling the development of vapours of ammonia and acids cannot be prevented. Similar difficulties arise if we effect the mixture in the inverse succession. Besides the change of lime-nitrogen into urea proceeds very slowly.

A surprisingly smooth progress of the reaction is obtained by mixing equivalent quantities of lime-nitrogen and nitric acid of any strength with cooling and stirring in an acidulated solution of calcium-nitrate. For it has been found that calcium-nitrate in a fairly concentrated solution has a strong catalytic effect in accelerating very much the transformation of lime-nitrogen into urea.

If for example 20 kg. of lime-nitrogen are gradually and carefully within 30 minutes brought into 200 kg. of nitric acid of 20%, the solution being kept at a temperature not exceeding 20° C., 50% of the lime-nitrogen are changed into urea after 4 hours. The total amount of lime-nitrogen is changed into urea after 15 hours.

The process for which a patent is applied for is however as follows:

20 kg. of lime-nitrogen are brought gradually and carefully within 30 minutes into 100 liters of a solution of nitrate of lime of 1.5 specif. gravity. Simultaneously 65 kg. of nitric-acid of 40° Bé. are added and the whole is kept during this process at a temperature not exceeding 20° C. In adapting this process the whole amount of lime-nitrogen is changed into urea in only 15 minutes.

The so obtained reaction mixture can be worked up in different ways. The bigger part of it can for example be neutralized with lime, it can be filtered and evaporated and a solid mixture of urea and nitrate of lime will be obtained. The smaller part of the liquid left can be used for a new operation instead of the solution of nitrate of lime.

Having now described our invention what we claim is:

Process of producing urea from lime-nitrogen by mixing lime-nitrogen with nitric-acid in presence of a concentrated solution of nitrate of calcium.

In testimony whereof we affix our signatures.

DR. OTTO NYDEGGER.
HENRY SCHELLENBERG.